United States Patent [19]

Berenbaum et al.

[11] Patent Number: 4,562,538

[45] Date of Patent: Dec. 31, 1985

[54] MICROPROCESSOR HAVING DECISION POINTER TO PROCESS RESTORE POSITION

[75] Inventors: Alan D. Berenbaum, Summit, N.J.; Anand Jagannathan, Hopkinton, Mass.; John J. Molinelli, Fair Haven; Steven P. Pekarich, Eatontown, both of N.J.

[73] Assignee: AT&T Bell Laboratories, Murray Hill, N.J.

[21] Appl. No.: 494,776

[22] Filed: May 16, 1983

[51] Int. Cl.[4] ............................................... G06F 9/00
[52] U.S. Cl. .................................................. 364/200
[58] Field of Search ... 364/200 MS File, 900 MS File, 364/300 MS File

[56] References Cited

U.S. PATENT DOCUMENTS

| 3,614,742 | 7/1968 | Watson et al. ...................... 364/200 |
| 4,084,224 | 4/1978 | Appell et al. ....................... 364/200 |
| 4,123,795 | 10/1978 | Dean, Jr. et al. ................... 364/200 |
| 4,351,024 | 9/1982 | Bradley et al. ..................... 364/200 |
| 4,447,874 | 5/1984 | Bradley et al. ..................... 364/200 |
| 4,484,274 | 11/1984 | Berenbaum et al. ................ 364/200 |

Primary Examiner—James D. Thomas
Assistant Examiner—William G. Niessen
Attorney, Agent, or Firm—Herbert M. Shapiro; Henry T. Brendzel

[57] ABSTRACT

Process switch operations common in multiprogramming environments in commercially available data processors, are carried out faster by providing a decision-making capability for determining whether it is later to be restored at the beginning of the process or at the point of interruption. Both hardware and software implementations are disclosed.

4 Claims, 17 Drawing Figures

FIG. 4
EXECUTE UNIT

FIG. 5
FETCH UNIT

PBC OF PROCESS TO BE EXECUTED

FIG. 14

REGISTERS

FIG. 15

PCB OF PROCESS AFTER PROCESS SWITCH

FIG. 16

REGISTERS

MICROPROCESSOR HAVING DECISION POINTER TO PROCESS RESTORE POSITION

FIELD OF THE INVENTION

This invention is directed at a data processing system and, more particularly, at a system for carrying out context (or process) switch operations in a multiprogramming environment.

BACKGROUND OF THE INVENTION

We will adopt the convention that the term "program" defines a stream of both instructions and data that a user can request an operating system to transfer, link, and execute. An "executable" program in memory is called an "image". The (hardware) context in which an image is executed is called a "process" and the term "process" thus characterizes the complete unit of execution in the computer system.

A context (or process) switch operation can be understood to occur in a multiprogramming environment where several processes (individual streams of code) are ready for execution at any one time. The term "process switch operation" thus refers to the procedure for reassigning the processor from a currently running process to a successor process.

In order to achieve a high performance system, a processor has to be structured to enable the operating system to switch execution rapidly between individual processes. Since a process is a stream of instructions and data defined by a hardware context, each process has a unique identification in the computer system, the stream of code being executed at any instant being determined by its hardware context. The term "hardware context" refers to the information loaded in the processor's registers that identifies where the stream of instructions and data are located, which instruction to execute next, and what the processor status is during execution. In an illustrative prior art system (Digital Equipment Corporation VAX-11 computer) the computer's operating system switches between processes by requesting the processor to save one process hardware context and load another via a specific set of instructions.

In a microprocessor, process switch operations are controlled on-chip. Specifically, a microprocessor typically includes one or more programmed logic arrays (PLAs) each with word lines along which a pattern of transistors are defined in a manner determinative of output codes operative to control various other elements of the microprocessor. The pattern of transistors along each word line is called "microcode", the totality of microcode lines defined by a PLA being referred to as a "microprogram". Each word line, specifically, defines a particular set of output bits representative of a line of microcode. Sequences of microcode instructions are generated at the output register of the PLA and applied to various registers, inter alia, to control data flow and processing on the chip, often responsive to a single instruction at the input to the PLA.

An input instruction to a PLA is referred to as an "opcode", a sequence of such instructions being referred to as "macrocode". It is common during operation for instructions to be introduced to the chip from a memory which is external to the chip. Such instructions often are latched in an on-chip instruction register for processing under the control of the PLA. A "process switch operation", in this context, is controlled by a sequence of microcode instructions generated at the output register of a PLA.

When a process switch operation occurs in a prior art system, the processor operates in two phases: the first phase is to save (store) the current state of the interrupted process for resumption at a later time. The second phase is to set up (restore) the new state for the successor process. At the conclusion of the successor process, the processor operates to re-establish the state of the previous (or some other) process.

The steps carried out in response to a process switch command in prior art systems are summarized in Table I as follows:

TABLE I

| | |
|---|---|
| 1. save SP, PC, and PSW registers of current process | STORE |
| 2. save general purpose registers of current process | |
| 3. set up SP, PC and PSW registers for new process | RESTORE |
| 4. set up general purpose registers for new process | | where "SP" stands for stack pointer, "PC" stands for program counter, and "PSW" stands for process status word. The problem which this invention addresses is that an excessive amount of processor time is spent on the overhead associated with managing a plurality of processes in general and on process switch operations in particular. The need to shorten that time is particularly apparent for multiuser timesharing computer systems where noticeable waiting periods are encountered by users, due to the time the processor spends on process switches.

There are different types of processes which occur during processor operation. For example, there are some processes which when interrupted, always are restored to the beginning of the process. An example of this is an interrupt process. Other processes such as a user process may be interrupted and later restored at the point of interruption. It has been realized that undue amounts of computer time are spent on restoring interrupted processes so that the process always restarts at the beginning.

BRIEF DESCRIPTION OF ILLUSTRATIVE EMBODIMENTS OF THE INVENTION

The invention is based on the realization that an "initializing" or "I" bit may be stored to an advantage in the PSW to indicate whether an interrupted process is to be restored, at a later time, at the beginning of the process or at the point of interruption. This I bit is employed in conjunction with a process control block (PCB) in memory. The PCB contains initial process context information (PSW, PC and SP) in the first 12 bytes or in the second 12 bytes. If the I bit is a binary one, the PCB pointer is set to the first address in the PCB and the contents of the PSW, PC and SP registers of the interrupted process are stored in the second 12-byte addresses. If the I bit is a binary zero, the pointer points to the 13th address in the PCB when a process switch occurs.

A process requires initial values for the SP, the PC and the PSW so the process can be started in the correct state, as indicated in steps 3 and 4 of Table I. A process, once started, may itself be interrupted by another. As part of the process switch to the new process, the state of the first process, somewhere in the middle of its execution, is saved in memory, as indicated in steps 1 and 2 of Table 1. If the first process must, at some later time, be started with its initial values, the memory used for storing the intermediate state must be different from the memory where the initial state is stored. A processor using the principles of the invention includes means responsive to a request for a process switch to a process that will use different memory for steps 3 and 4 than for steps 1 and 2. In particular, each process includes means for controlling the adjustment of the area used for saving the process state. Significant improvement in the (average) time required to perform a process switch operation is achieved as a result.

In one embodiment, an I bit is added to the PSW register and additional hardware is included in the datapath portion of the microprocessor for testing the value of that bit. The additional hardware is operative in cooperation with a microprogam stored in on-chip ROM (read only memory) to interconnect means responsive to a process switch command for instructing a PLA to execute the desired operation. In an alternative embodiment, the process switch operation is accomplished by a second microprogram in the absence of additional hardware. The microprogram, in this instance also, is stored in ROM and is responsive, for example, to macrocode via an instruction register (and PLAs) for executing an operation. In either case, the PCBs (in memory) are of lengths N and N+M where M is allocated to accommodate initialization information for those processes which are restored to process at the beginning position. The "I" bit determines whether or not the PCBP should be adjusted to point to a different area of memory to provide space for saving the PC, the PSW and the SP on a process switch. Specifically, during a process switch operation, the I bit in the PSW is saved, and possibly modified, in a manner to control the adjustment of the PCBP.

DETAILED DESCRIPTION

Figure 1:
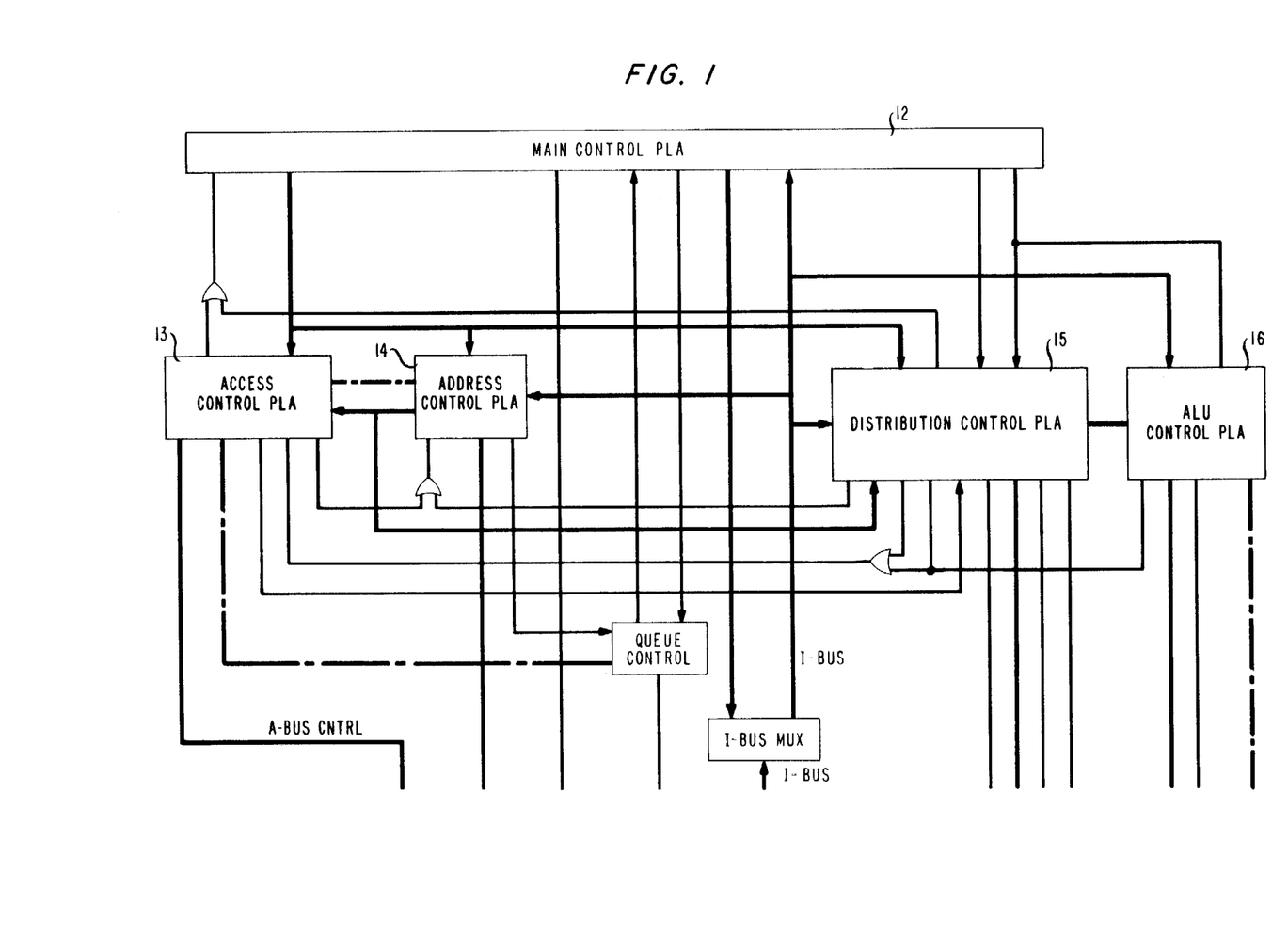
FIGS. 1, 2 and 3 are block diagrams of an illustrative semiconductor microprocessor chip.
Figure 2:
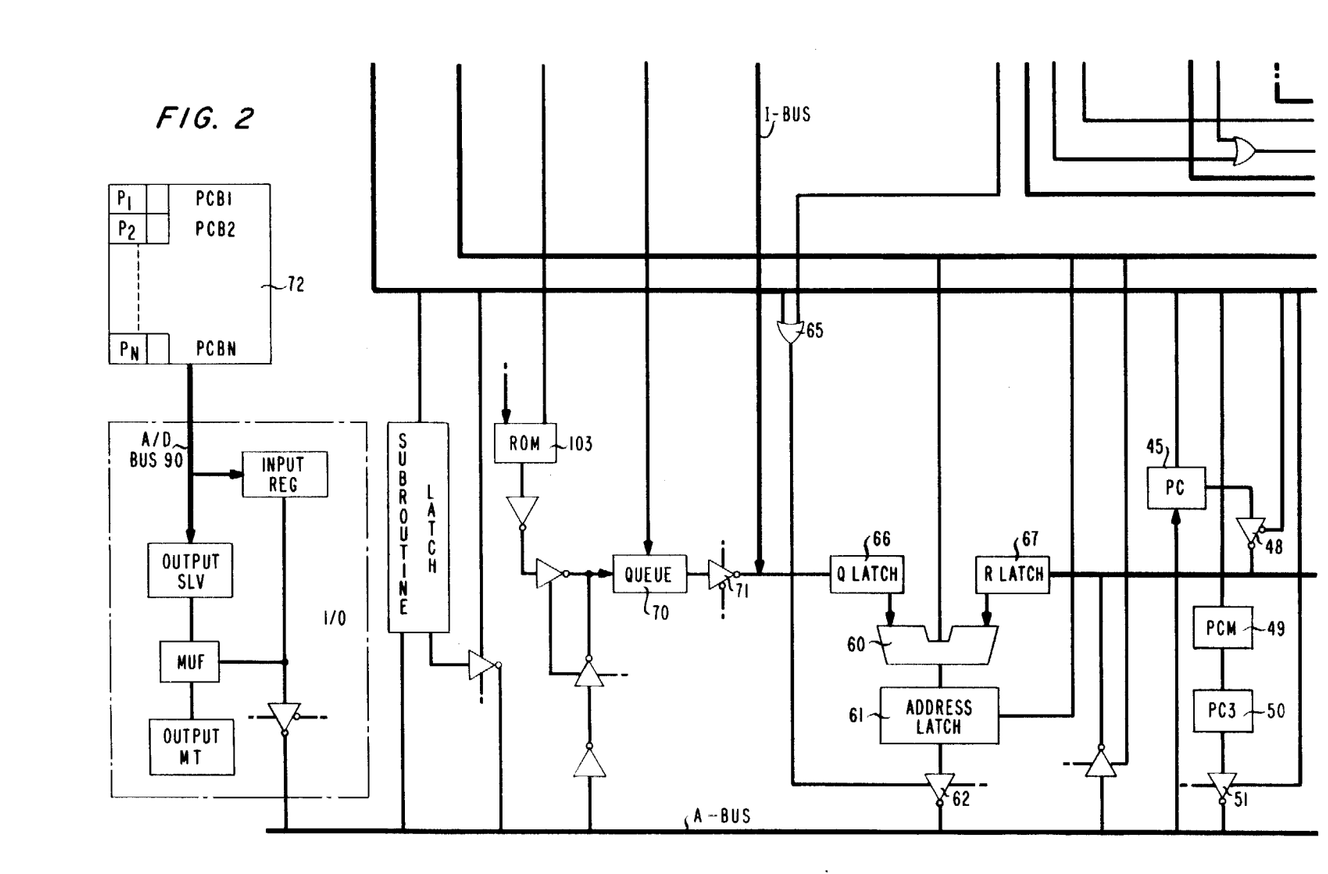
Figure 3:
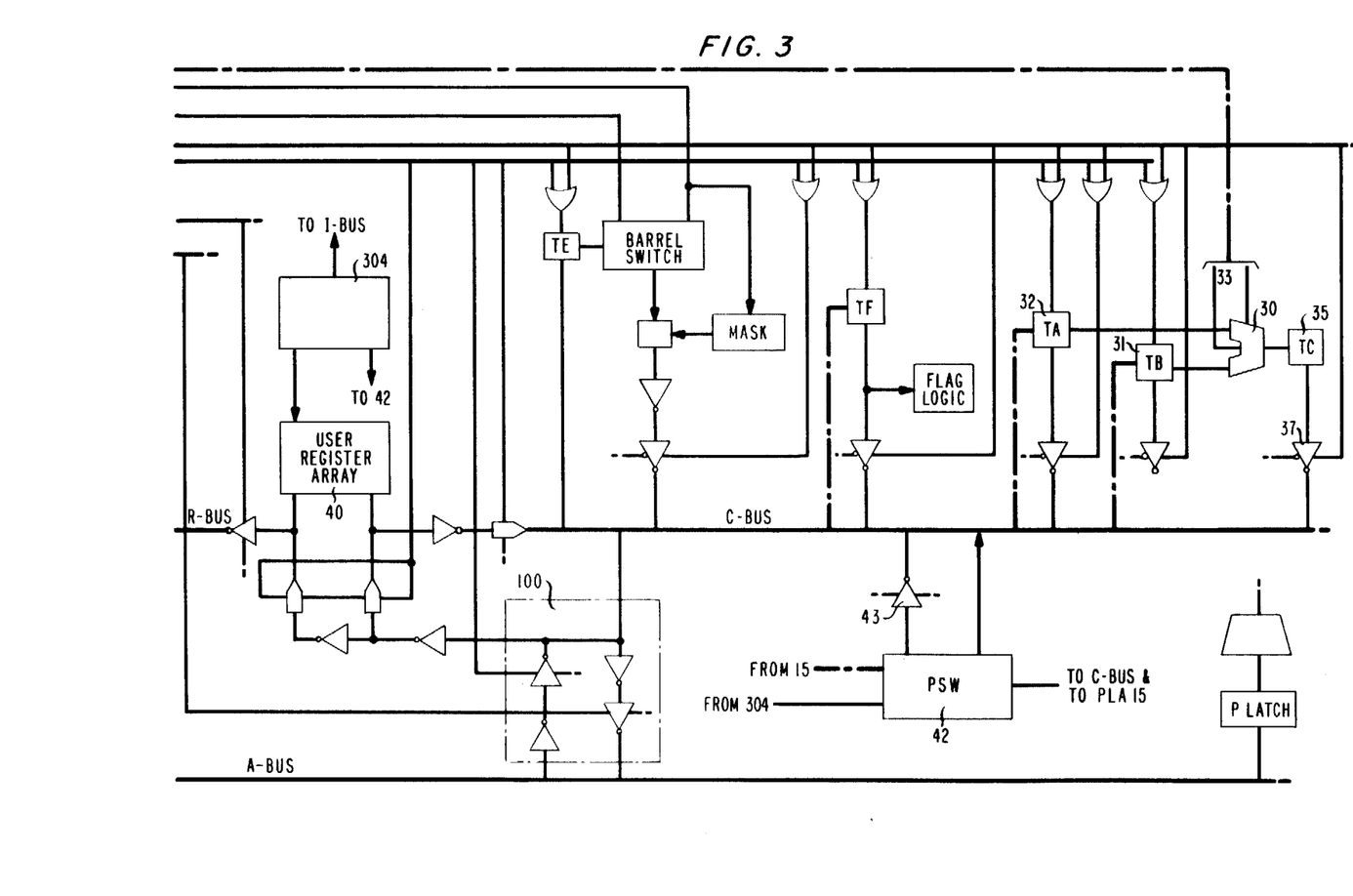

FIGS. 1, 2 and 3 show a block diagram of a semiconductor microprocessor chip 10. The chip has defined in it a plurality of programmable logic arrays (PLAs) represented by blocks 12, 13, 14, 15 and 16. The various PLAs are interconnected into a control hierarchy in accordance with the teachings of U.S. Pat. No. 4,399,516. The blocks are labeled according to function as MAIN control, ACCESS control, ADDRESS control, DISTRIBUTION control and ARITHMETIC logic unit (ALU) control, respectively. The various PLAs are interconnected to interact with one another to control the operation of the datapath portion of the chip as is described more fully hereinafter.

The datapath portion of the chip comprises the elements which carry out operations on data from memory. The datapath typically includes user registers, temporary registers, an arithmetic logic unit (ALU), address arithmetic unit (AAU), counters, etc. The organization of the datapath and the interconnection of the datapath and control portions of the microprocessor are now discussed as a basis for an illustrative operation.

The datapath portion of chip 10 includes specifically, an ALU 30 along with two temporary registers 31 and 32, TA and TB, as shown in FIG. 3. The outputs of the registers are connected to inputs to the ALU. The ALU carries out operations on data applied by the registers to the ALU according to the microcode applied to the ALU from the ALU control PLA over lines represented by symbolic line 33. The output of the ALU is applied to temporary register 35 to be applied to the "C-BUS" by means of tri-state buffer 37. The data in the temporary registers originates from selected ones of user registers 40 or from memory locations.

A PSW (process status word) register 42 is connected to the C-BUS via a tri-state buffer 43. The PSW register is a special purpose register that a program uses to check its status and to control synchronous error conditions. The process status word contains two sets of bit fields, the condition codes and the trap enable flags similar to those described in the *VAX* 11-780 *Hardware Handbook*, 1978 edition by Digital Equipment Corporation on page 43, et seq.

A program counter (PC) 45 of FIG. 2 is connected between the A-BUS at its input and the output of the access control PLA 13. The output of the program counter is connected to the R-BUS via tri-state buffer 48. The output of PLA 13 also is connected to the gate input of buffer 48. A program counter master latch 49 is connected between the output of the program counter and the A-BUS. The output of latch 49 is connected to the input of a slave latch 50. Slave latch 50 is connected to the A-BUS via a tri-state buffer 51. The gate input to buffer 51 is connected to the output of Access Control PLA 13. Program counter 45 contains the address of the next instruction to be executed as described on page 41 of the above-mentioned VAX-11 handbook and permits a programmer to write position independent code as is well understood in the art.

An Address Arithmetic Unit 60 and associated address latch 61 are connected serially between the output of Address Control PLA 14 and the A-BUS via tri-state buffer 62. The tri-state buffer gate input is connected via AND circuit 65 to the output of PLA 13. Another input to circuit 65 is connected to the output of distribution control PLA 15. Outputs from Q latch and R latch 66 and 67, respectively, are connected to inputs to ALU 60. Queue 70 applies its output to latch 66 via tri-state buffer 71 and, via the I-BUS, to instruction registers (latches) at the inputs to MAIN, ADDRESS, and DISTRIBUTION PLAs 12, 14 and 15. Each of the outputs represents an opcode from the macroprogram stream. Latch 67 accepts data from a selected user register. The AAU forms the address of the operand from the two inputs.

The microprocessor is operative to execute operations in ALU 30 under control of ALU control PLA 16 on data determined and organized by PLAs 14 and 15. Distribution PLA 15 controls the A- and C-BUS multiplexer 100 by controlling the data path from memory and the address arithmetic unit controls the loading of data into temporary registers 31 and 32 via output buffer 62 if the AAU result represents data (not an address). PLA 16 controls the ALU operation. The access control PLA 13 performs access of memory 72 using addresses formed by AAU 60 under control of PLA 14 under the control of MAIN PLA 12 as described in the above-mentioned patent application of Blahut et al.

Figure 4:
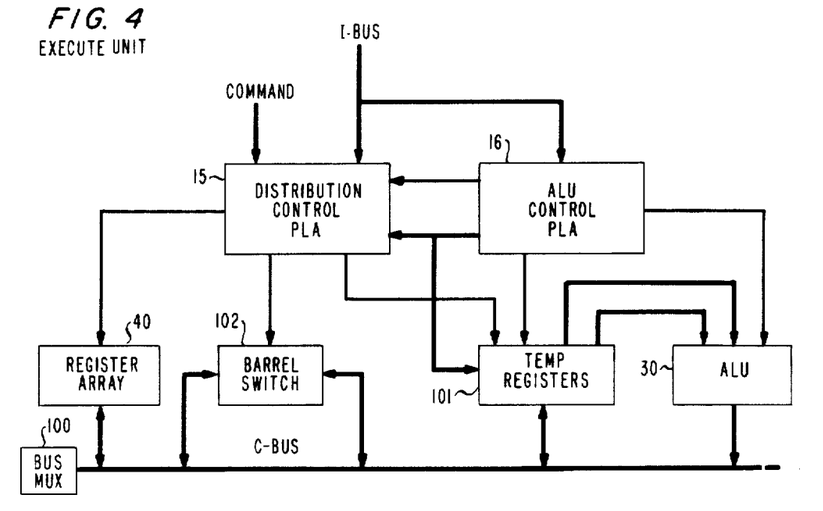
FIGS. 4 and 5 are schematic representations of the organization of the microprocessor of FIGS. 2 and 3.

The foregoing portion of the microprocessor is commonly referred to as the "Execute" unit and is shown in more simplified block diagram form in FIG. 4. Data from memory are stored selectively in user register array 40 via the A-BUS and A- and C-BUS multiplexer 100. Data are moved to the temporary registers 31 and 32 of FIG. 3 shown collectively as 101 in FIG. 4 via a barrel switch 102 described in U.S. Pat. No. 4,396,994.

Figure 5:
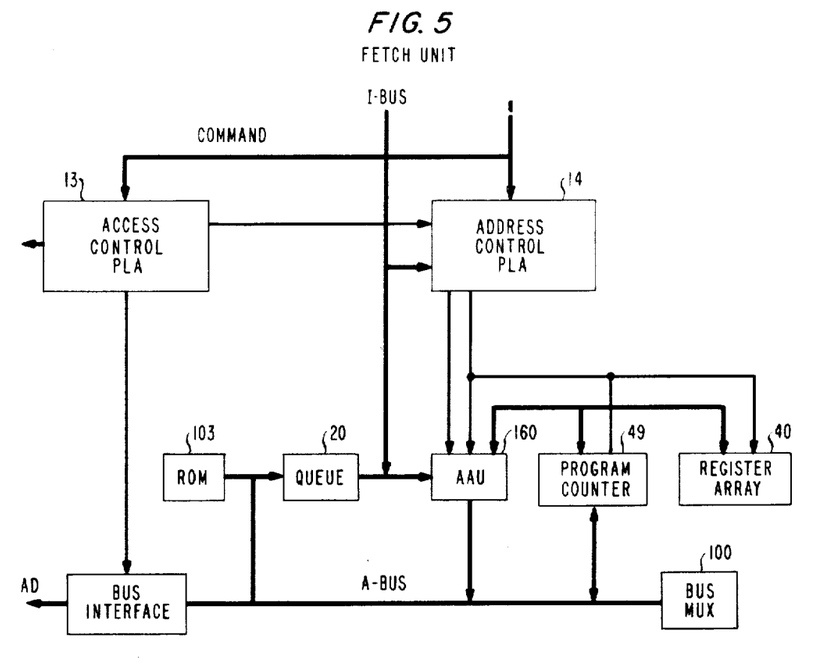

The remainder of the datapath operates as the fetch unit. That is to say, PLAs 13 and 14 of FIG. 5 control the movement of instructions (opcode) and data from memory. Data is moved to user registers or other destinations on chip; opcodes go to the queue 70. Program counter 49 increments to point to the next memory address. AAU 60, which contains an adder, controls more complex address changes as is well understood.

Memory 72 stores a number of processes in association with process control blocks. The processes are designated $P_1, P_2 \ldots P_n$ and the associated process control blocks are designated PCB1, PCB2 ... PCBM. The process control block contains all of the switchable process information collected into compact form for ease of movement to and from the internal (user visible) registers as described in the above-noted *VAX*-11 780 *Hardware Handbook* starting on page 59.

When a process switch command is moved from memory to queue 70 as part of a program, command signals are applied to MAIN control PLA 12 which recognizes the command as a process switch instruction. Read only memory (ROM) 103 indicates a set of process switch instructions to be applied to PLA 12 for organizing the operation of the processor for carrying out the process switch operation. Those instructions are in addresses in ROM and are accessed by PLA 12 in response to the signals applied to PLA 12. The instructions are included in a computer program along with comments identified as Appendix A herein. The program is a fragment written in a form of assembly language similar to that used with the above-mentioned VAX computer. Sufficient comments are provided to enable one skilled in assembly languages to understand the fragment.

A process control block pointer (PCBP) is located in one of the user registers 40. When a signal occurs to indicate the occurrence of a process switch instruction, the PCBP is changed from that of the current process to that of the new process. While a process is running, the stack pointer (SP—located in one of the user registers of array 40), the program counter (PC), the process status word (PSW) and the general purpose registers contain data which are typically updated on each cycle of operation of the microprocessor. These elements thus contain data which represent the instantaneous state of the process. When a process switch operation is called for, main control PLA 12 performs operations which copy the data in the PC, the SP and the PSW registers into the PCB (in memory) of the currently running process. Whether or not the data in the general registers is to be copied into the PCB of the currently running process is determined by the R bit in the PSW. Specifically, during a process switch operation, the R bit in the PSW is used, and possibly modified, in a manner to control the copying of the contents of the general purpose registers into the PCB. The function of the R bit is described in detail in U.S. Pat. No. 4,484,274. The determination as to whether the interrupted process later restarts at the point of interruption or at the beginning of the process is made in response to the I bit.

The fetch unit operates in the traditional mode to fetch data and instructions from memory 72. That is, when a program which is being executed currently calls for instructions or data or both from memory, PLAs 12, 13 and 14 operate to access the corresponding addresses in memory and to apply the contents of the address (or sequence of addresses) to the address and data BUS 90 for storage in queue 70. Data are also moved along the A-BUS and via the multiplexer 100 to the C-BUS for storage in user register 40 or in temporary registers 31 and 32. As the instructions are executed, program counter 49 is incremented in the usual fashion under the control of address control PLA 14. When the program calls for a subroutine stored in ROM 103, address control PLA 14 responds to clear the queue and to move the contents of the corresponding addresses in ROM to the queue for execution.

On each occasion that the program calls for a process switch operation, the memory block, say $P_2$ of FIG. 1 representing the new process is accompanied by a process control block, say PCB2 of FIG. 1. The process control block includes data for reorganizing the hardware for providing the necessary context for the new process—all the data needed to load the processor's programmable registers when a process switch operation is called for. Each time a process switch operation is called for, the operating system loads the processor's process control block base register (PCBP) with the address of a process control block and issues a process switch instruction. The I bit determines whether the new process is initiated at its beginning or at a point at which it was previously interrupted.

Figure 6:
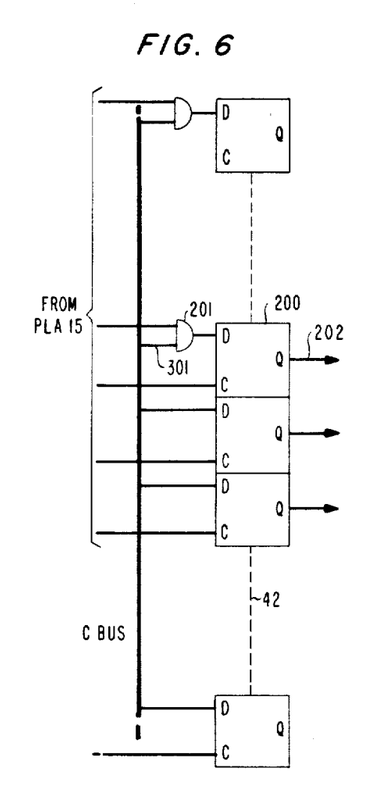
FIGS. 6 and 7 are circuit schematics of portions of the microprocessor of FIG. 1.
Figure 7:
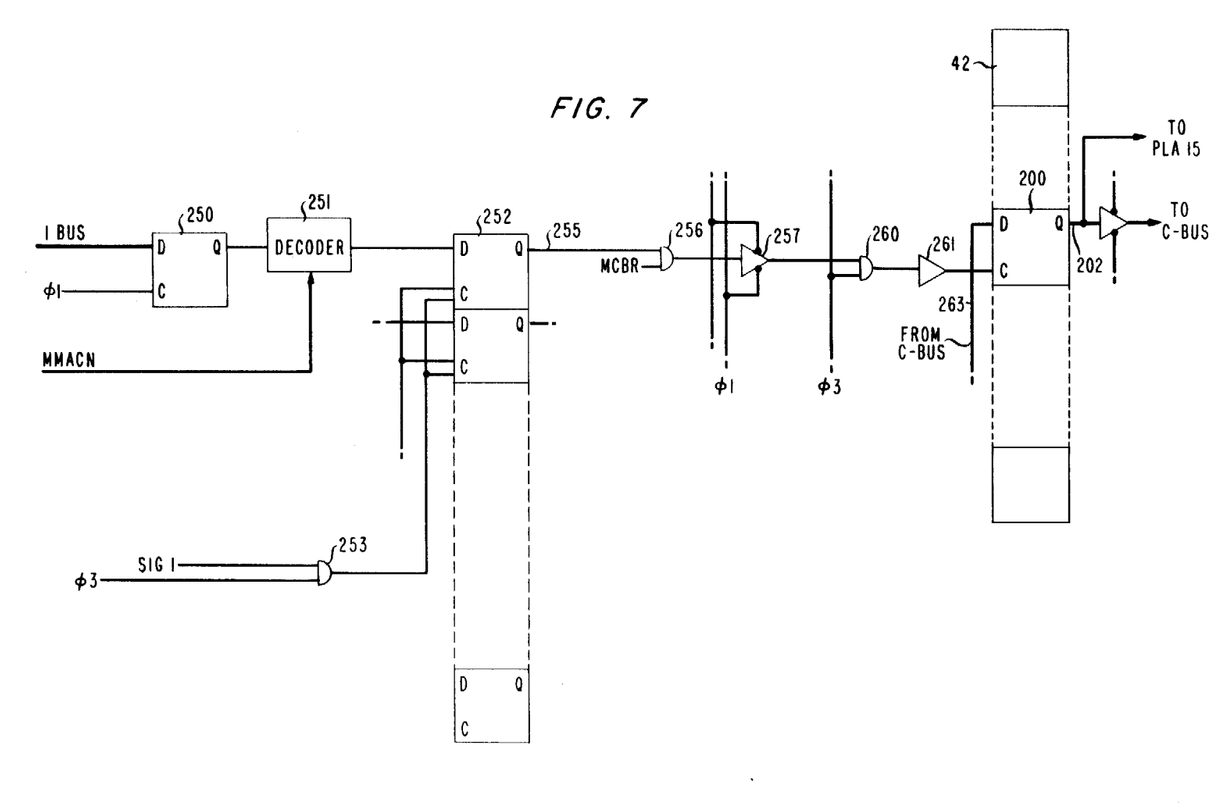

FIGS. 6 and 7 show hardware added to a microprocessor (in one particular embodiment) for determining the value of the I bit in the process status word (PSW). The hardware is operative with the program of Appendix A. Specifically, FIG. 6 shows the PSW register 42 including a latch 200. Data from a selected process control block (i.e., PCB2) in memory 72 is applied in parallel to the data input (D) of the latches of the register via the C-BUS as indicated in the Figure. Appropriate timing is applied to the clock input (C) of the latches of the register by the distribution control PLA 15. An OR circuit 201 is provided with inputs connected to the C-BUS and to outputs from PLA 15.

The output (Q) 202 of latch 200 is connected to the C-BUS and to an input to PLA 15. The former connection is for storing the bit, along with others of the PSW, in the current PCB reflecting the instantaneous status of the current process. The latter connection is for the purpose of reading the I bit and for making a decision. The organization and operation of the illustrative embodiments herein are consistent with the description in the above-noted *VAX*-11 780 *Hardware Handbook* with the exception that an I bit is added and that a decision is made on the basis of that bit as to the point at which a restored process is initiated when a process switch operation is called for.

FIG. 7 shows the logic circuitry associated with using the I bit (latch 200). The I-BUS is connected to the data inputs of 8-bit latch 250. The c inputs to the latch are connected to the $\phi_1$ output of the clock (not shown). The output (Q) of latch 250 is connected to an input of decoder 251. The output of ROM 103 of FIG. 2 is connected to a second input of decoder 251. The output of decoder 251 is connected to the data (D) inputs to 8-bit latch 252. The output of AND circuit 253 is connected to the clock inputs of latch 252. The inputs to AND circuit 253 are connected to the $\phi_3$ clock output of the clock circuit and to the output of MAIN PLA 12 for receiving signal SIG-1.

The outputs of latch 252, as represented by conductor 255, are connected to inputs to AND circuits as represented by AND circuit 256. A second input of AND circuit 256 is connected to the output of distribution PLA 15. The output of AND circuit 256 is connected to the input to latch 257. Latch 257 is a tristatable clocked buffer having a floating output except during phase $\phi_1$.

The output of latch 257 is connected to one input of AND circuit 260. The $\phi_3$ output of the clock circuit is connected to a second output of circuit 260. The output of circuit 260 is connected to the input of buffer 261. The output of buffer 261 is connected to the clock input (c) of latch 200. Line 263 connects the C-BUS (FIG. 3) to the data input of latch 200. The output (202) of latch 200 is connected to the C-BUS (FIG. 1) via bus drivers and to PLA 15.

In operation, the data on the I-BUS is latched onto latch 250 by clock signal $\phi_1$. The content of latch 250 is decoded along with signal MMACN, a ROM-ON signal which indicates that code is being executed out of ROM 103. If the content of latch 250 and signal MMACN indicate that an I bit reference is desired, the signal MIBR (the I bit reference signal) is asserted, as shown, at the output of decoder 251.

Signal MIBR is latched by signal SIG 1 from MAIN PLA 12 enabled by clock signal $\phi_3$. Signal MCBR indicates that a data value is to be written from the C-BUS into a register. The resulting bit of the signal on line 255 is combined with signal MCBR from distribution PLA (15). The resulting signal is delayed to phase $\phi_1$ at latch 257. At a following phase $\phi_3$, if the output of latch 257 is high, the corresponding data bit on the C-BUS is latched into the I bit latch 200 of PSW register 42.

Figure 8:
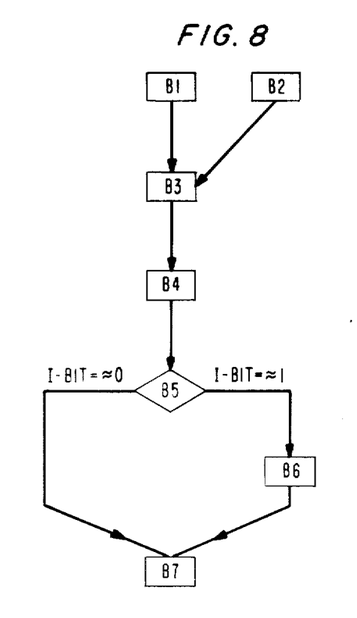
FIG. 8 is a flow diagram of the operation of a portion of the microprocessor of FIGS. 1, 2 and 3.

FIG. 8 shows a flow chart of the sequence of operations when an interrupt is invoked in the ordinary sequence of events. An interrupt causes one (current) process to be suspended and a new process to be initiated on the processor. Block B1 in the Figure represents the initialization of the sequence. This includes fetching an interrupt identifier from an external device and fetching a PCBP for the interrupt process.

Block B3 in the Figure represents the storing of the PCBP of the current process on the interrupt stack. The register array 40 of FIG. 3 includes an interrupt stack pointer which supplies the memory location for storing the PCBP. Block B4 represents the action where the PC, SP and PSW registers are stored into the PCB (Process Control Block) of the current process, in memory pointed to by the PCBP. The PCBP is then set to the PCBP of the interrupt process, and the PC, SP and PSW registers are loaded from the PCB of the interrupt process.

Block B5 represents the evaluation of the I bit of the new PSW. If the bit is a binary 1, the PCBP register is incremented by 12, as indicated in Block B6. The PCBP will then point past the memory which contained the initial values of the PC, SP and PSW registers for the interrupt process. In addition, the I bit of the PSW will be set to 0. If the I bit is a binary 0, no action is taken.

Block B7 represents the completion of the interrupt sequence process switch, and the initiation of the process execution.

Another means of carrying out a process switch to a new process is with a CALL PROCESS instruction. The current process is suspended and a new process is initiated on the processor. Block B2 represents the initiation of this sequence, which includes fetching a PCBP for the new process. After Block B2 the sequence continues with Block B3, and proceeds in exactly the same manner as the interrupt sequence described above.

The I bit is particularly useful for processes initiated by an interrupt sequence, since it is likely that an interrupt process will be executed many times, once for each time a device causes an interrupt, and each time the process generated should execute in the same way. If the I bit of the interrupt process is set, the initial values of the control registers will be preserved for the next invocation of the process, even if the current process is itself interrupted.

FIGS. 9–16 depict the registers PSW and PCBP along with the contents of memory representing the Process Control Block (PCB) of a process. The PCB provides memory space to save the processor state when a process is interrupted and the I bit function assures that the initial PCB is not corrupted by the interrupt. If the function was not provided, another means of initiating a process would be necessary, and the adjustment of the PCB would have to take place separately.

Figure 9:
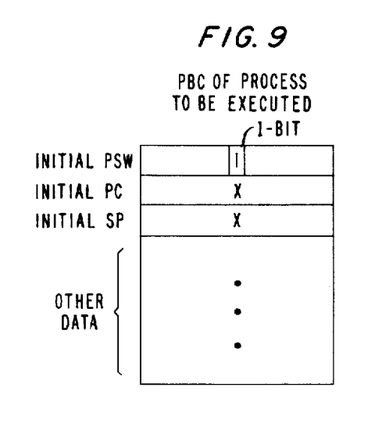
FIGS. 9-16 are block diagrams of memory sections and registers in the microprocessor of FIG. 1 showing data control therein during operation.
Figure 10:
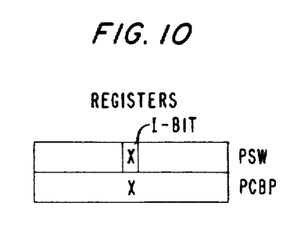

The operation is now described in terms of a portion of memory 72 (of FIG. 2) in which an image of the registers is stored and a schematic of the PSW and PCBP registers. Specifically, FIGS. 9 and 10 show the initial state of the pertinent section of memory and the two registers. FIG. 9 designates the pertinent section of memory as the "PCB" in which the first three control registers are stored, as well as space for other data. The pertinent section of memory in FIG. 9 also includes the image of the PSW register with the I bit set to 1. Note that the section of memory shown in FIG. 9 is labeled "PCB of process to be executed", which may, for example, correspond to PCB1 of memory 72 of FIG. 2.

FIG. 10 shows the registers PSW and PCBP in their initial state. The I bit is initially in an unknown state, as is the PCBP.

Figure 11:
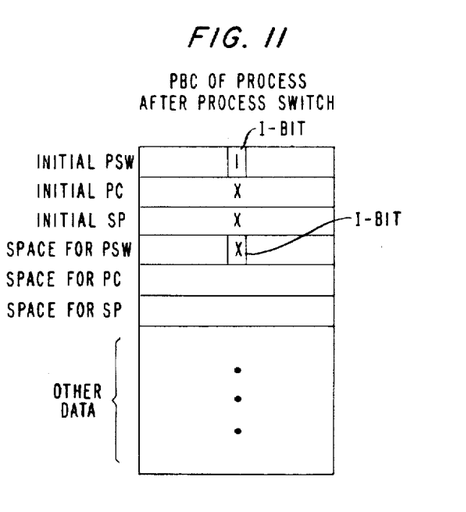
Figure 12:
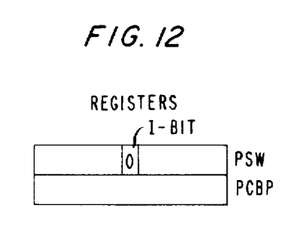

FIGS. 11 and 12 represent the state of the microprocessor after the new process has been initiated, either after response to an interrupt or by executing a "call process" (CALLPS) instruction. FIG. 11 represents the PCB of the process, as in FIG. 9, and FIG. 12 represents the registers PSW and PCBP. Note that the I bit of he PSW has been set to 0, while the I bit of the PCB has remained at 1. Because of this, the I bit initialization function will not be reexecuted for the process if it is interrupted at a later time by another process. The I bit of the "space reserved for the PSW" is unknown; it will be set to that of the PSW if the process is interrupted. Also, the PCBP points to the "space reserved for the PSW", not the "old PSW."

Figure 13:
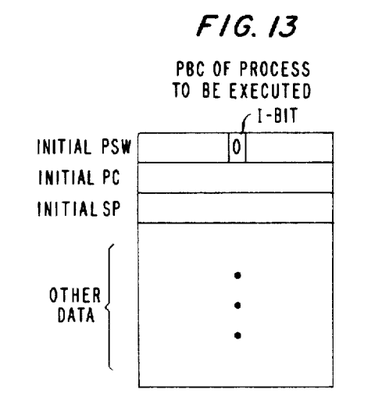
Figure 14:
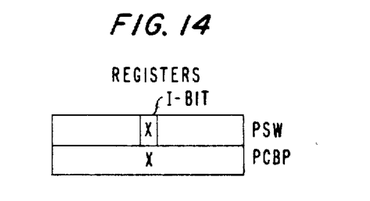

The initial state in the instance where the I bit of the new process equals 0 is shown in FIGS. 13 and 14. The individual Figures are designated as were their counterparts in FIGS. 9 and 10.

Figure 15:
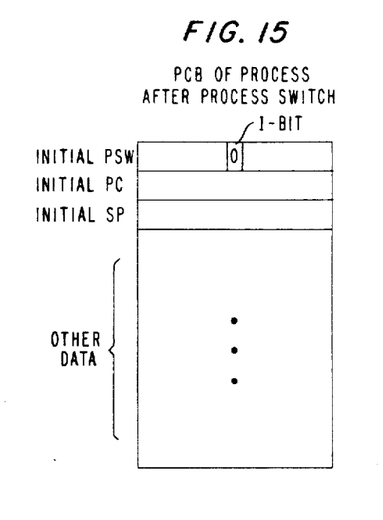
Figure 16:
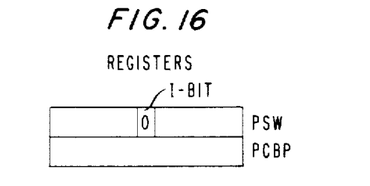
Figure 17:
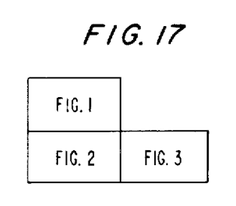
FIG. 17 is a block diagram of the relationship between FIGS. 1, 2 and 3.

FIGS. 15 and 16 represent the state of the microprocessor after the new process has been initiated when the initial state of the I bit of the PSW in the PCB was 0. Note that the I bit of both the PSW and the memory image of the PSW in the PCB is 0. Also, the PCBP points to "initial PSW."

The operation indicated in FIG. 8 and FIGS. 9-16 is implemented with special circuitry as shown in FIGS. 6 and 7 and with microcode stored in ROM. This special circuitry enables testing for the I bit to be more efficient than it would be in its absence. In the absence of the special circuitry of FIGS. 6 and 7, the microcode above is modified to test the I bit with ordinary microinstructions. The microprogram for this embodiment is shown with comments in Appendix B. The lines of code indicated by the notation #**# are changed from the program of Appendix A to enable the processor to operate without the special circuitry.

A third embodiment would not use an I bit at all, but instead would perform the operation with a regular instruction executed as the first instruction of the process. This instruction would add 12 (the number of bytes in the three words of memory required to store the PSW, the PC and the SP) to the PCBP. The microprogram for this embodiment is shown in Appendix C. The program of Appendix C is a modification of that shown in Appendix A where lines of the former are deleted. The notation #**# notes where lines were deleted from Appendix A. In this embodiment, each process with the additional instruction constitutes a control means for controllably restoring an interrupted process at the beginning or at the point of interruption when a process switch operation occurs.

PRINTOUT APPENDIX A

In the following program, the following applies:

Instructions are of the form
        label: opcode  operands
where the label is optional and there may be from 0 to 3 operands.
Constants are indicated by a "&", registers by a "%".
Registers surrounded by parentneses (e.g., (%r0) ) are used as
pointers, so the operand is fetched from memory.
If a number precedes a register surrounded by parenteses (e.g., 4(%r0) ),
that number is added to the contents of the register to form the
memory address.
If a "*" precedes the operand, then another level of indirection is
implied.
All characters, up to the end of a line, following a "#" are treated
as a comment.

The following registers are used in the program:
%r0                         General purpose register 0
%PSW                        Processor Status Word.
%pcbp                       Process Control Block Pointer.
%tma                        Temporary register a.
The following "registers" control special hardware:
%isc                        On writes, sets bits 0-6 of the PSW, which are
                            otherwise read-only.
%kff                        On reads, forces the CPU into kernel mode.  On
                            writes, CPU mode taken from execution level
                            field of PSW.
%iPSW                       On writes, stores only the I-bit into the PSW.

The following instructions are used in the program:
This group of instructions sets condition codes, used by branch
instructions.
MOVW    operand1,operand2   Move data from operand1 to operand2
MOVAW   operand1,operand2   Move the address of operand1 to operand2
PMOVW   operand1,operand2   MOVW, but permits entry to Macro-ROM.
                            Restricted to privileged mode access.
ADDW2   operand1,operand2   Add operand1 to operand2
ANDW2   operand1,operand2   Logical AND of operand1 and operand2
BITW    operand1,operand2   Logical AND of operand1 and operand2.  Sets
                            condition codes only.
CLRW    operand1            Zero's operand1
TSTW    operand1            Reads operand1 and sets condition codes.
FSINT   operand1            Fetch interrupt id from data lines, shift left
                            by 2 bits and store in operand1
This group of instructions do not set condition codes.
JMP     operand1            Jump: set PC to operand1
MBRH    operand1            Branch to 16-bit operand1 in MACRO-ROM
MEND                        Return from MACRO-ROM to user code.
MBEQLH  operand1            If equality condition holds, transfer to
                            16-bit address operand1.

The following constants are used in the program:
xit_tm_0                          Octal 073: sets ISC to normal value during
                                  user program; isc=7, ft=normal, tm=0.
i_bit                             Hex 0x200: bit position of I-bit in PSW.
~i_bit                            The 32-bit complement of i_bit The program as it exists in the BELLMAC-32, slightly modified for clarity:
Boxes in the flow chart in Figure 8 are labeled.

```

on interrupt

B1:                                     # set status and fault indications
                                        # code for this operation is omitted
        FSINT    %tma                   # tma <- int id from pins (8 bits) << 2
        ADDW2    &140,%tma              # tma <- tma + 140 (start addr of int vector)
        TSTW     %kff                   # force kernel mode on memory accesses

#   Tma points to a PCBP. Put that PCBP into tma, and push the old PCBP
onto the interrupt stack.

B3:     MOVW     &on_res_1,%isc
        MOVW     (%tma),%tma            # tma <- PCBP pointed to by tma
        MOVW     &pcbfet,%sts
        MOVW     &on_res_2,%isc
        MOVW     %pcbp,(%isp)           # push current PCBP onto interrupt stack
        ADDW2    &4,%isp                # adjust ISP to effect push
        MOVW     &on_pcs_0,%isc

#        fall through to...

B4:     MOVAW    0(%pc),4(%pcbp)        # save pc in PCB
                                        #   tma contains new PCBP
                                        # save registers in current PCB
                                        # pcbp <- tma,
                                        # and set psw, pc and sp from new PCB.
        MOVW     %PSW,(%pcbp)           # save psw in PCB
        MOVW     %sp,8(%pcbp)           # save sp in PCB

#        if necessary, load registers from PCB for new process
the code for this operation has been omitted

load the new PCBP, then load control registers

        MOVW     %tma,%pcbp             # pcbp <- new PCBP

#        set status signals and potential error indication

        MOVW     (%pcbp),%PSW           # psw <- PSW from PCB (doesn't change r-bit)
        JMP      *4(%pcbp)              # pc <- PC from PCB
        MOVW     8(%pcbp),%sp           # sp <- SP from PCB
B5:     BITW     &i_bit,%PSW            # test i-bit in new PSW
        MBEQLH   B7                     # return if i-bit clear
B6:     CLRW     %iPSW                  # clear i-bit in psw
        ADDW2    &12,%pcbp              # change pcbp to skip initial portion
B7:     CLRW     %kff                   # unforce kernel mode on memory access
        MOVW     &xit_tm0,%isc          # isc <- 7, fault type <- normal
        MEND

#       CALLPS:  Call Process, invoke a process switch to the process
#                whose PCB is pointed to by %r0

B2:
CALLPS: PMOVW    %r0,%tma               # tma <- new PCBP from r0
        TSTW     %kff                   # force kernel mode on memory accesses
        MBRH     B3                     # join interrupt sequence
```

PRINTOUT—APPENDIX B

If the I-bit hardware did not exist, then the following code would have to be used. The changed lines are indicated with "#***#".

```

on interrupt

B1:                                 # set status and fault indications
                                    # code for this operation is omitted
        FSINI   %tma                # tma <- int id from pins (8 bits) << 2
        ADDW2   &140,%tma           # tma <- tma + 140 (start addr of int vector)
        TSTW    %kff                # force kernel mode on memory accesses

#    Tma points to a PCBP. Put that PCBP into tma, and push the old PCBP
onto the interrupt stack.

B3:     MOVW    &on_res_1,%isc
        MOVW    (%tma),%tma         # tma <- PCBP pointed to by tma
        MOVW    &pcbfet,%sts
        MOVW    &on_res_2,%isc
        MOVW    %pcbp,(%isp)        # push current PCBP onto interrupt stack
        ADDW2   &4,%isp             # adjust ISP to effect push
        MOVW    &on_pcs_0,%isc

#       fall through to...

B4:     MOVAW   0(%pc),4(%pcbp)     # save pc in PCB
                                    #  tma contains new PCBP
                                    # save registers in current PCB
                                    # pcbp <- tma,
                                    # and set psw, pc and sp from new PCB.
        MOVW    %PSW,(%pcbp)        # save psw in PCB
        MOVW    %sp,8(%pcbp)        # save sp in PCB

#       if necessary, load registers from PCB for new process
the code for this operation has been omitted

load the new PCBP, then load control registers

        MOVW    %tma,%pcbp          # pcbp <- new PCBP
#       set status signals and potential error indication

        MOVW    (%pcbp),%PSW        # psw <- PSW from PCB (doesn't change r-bit)
        JMP     *4(%pcbp)           # pc <- PC from PCB
        MOVW    8(%pcbp),%sp        # sp <- SP from PCB
B5:     BITW    &i_bit,%PSW         # test i-bit in new PSW
        MBEQLH  B7                  # return if i-bit clear
B6:     ANDW2   &~i_bit,%PSW              #***#
                                    # clear i-bit in psw
        ADDW2   &12,%pcbp           # change pcbp to skip initial portion
B7:     CLRW    %kff                # unforce kernel mode on memory access
        MOVW    &xit_tm0,%isc       # isc <- 7, fault type <- normal
        MEND

#       CALLPS: Call Process, invoke a process switch to the process
#               whose PCB is pointed to by %r0

B2:
CALLPS: PMOVW   %r0,%tma            # tma <- new PCBP from r0
        TSTW    %kff                # force kernel mode on memory accesses
        MBRH    B3                  # join interrupt sequence
```

PRINTOUT APPENDIX C

If the I-bit function is not used, then the following code would have to be used. The lines deleted are indicated with "#***#".

```
on interrupt

B1:                                         # set status and fault indications
                                            # code for this operation is omitted
        FSINT   %tma                        # tma <- int id from pins (8 bits) << 2
        ADDW2   &140,%tma                   # tma <- tma + 140 (start addr of int vector)
        TSTW    %kff                        # force kernel mode on memory accesses

#   Tma points to a PCBP.  Put that PCBP into tma, and push the old PCBP
#   onto the interrupt stack.

B3:     MOVW    &on_res_1,%isc
        MOVW    (%tma),%tma                 # tma <- PCBP pointed to by tma
        MOVW    &pcbfet,%sts
        MOVW    &on_res_2,%isc
        MOVW    %pcbp,(%isp)                # push current PCBP onto interrupt stack
        ADDW2   &4,%isp                     # adjust ISP to effect push
        MOVW    &on_pcs_0,%isc

#       fall through to...

B4:     MOVAW   0(%pc),4(%pcbp)             # save pc in PCB
                                            #   tma contains new PCBP
                                            # save registers in current PCB
                                            # pcbp <- tma,
                                            # and set psw, pc and sp from new PCB.
        MOVW    %PSW,(%pcbp)                # save psw in PCB
        MOVW    %sp,8(%pcbp)                # save sp in PCB

#       if necessary, load registers from PCB for new process
the code for this operation has been omitted

load the new PCBP, then load control registers

        MOVW    %tma,%pcbp                  # pcbp <- new PCBP
        set status signals and potential error indication

        MOVW    (%pcbp),%PSW                # psw <- PSW from PCB (doesn't change r-bit)
        JMP     *4(%pcbp)                   # pc <- PC from PCB
        MOVW    8(%pcbp),%sp                # sp <- SP from PCB
                                            # here's wnere code would be deleted
                                            #***#
B7:     CLRW    %kff                        # unforce kernel mode on memory access
        MOVW    &xit_tm0,%isc               # isc <- 7, fault type <- normal
        MEND

#       CALLPS: Call Process, invoke a process switch to the process
#               whose PCB is pointed to by %r0

B2:
CALLPS: PMOVW   %r0,%tma                    # tma <- new PCBP from r0
        TSTW    %kff                        # force kernel mode on memory accesses
#       MBRH    B3                          # join interrupt sequence
```

What is claimed is:

1. A system for carrying out a current process, for allowing said process to be interrupted at a point of interruption before its completion, and for resuming the carrying out of said process either at the beginning of said process or at said point of interruption comprising:

a semiconductor integrated circuit microprocessor chip including a first register array for storing the hardware context of said current process and a second register array for storing instantaneous data being processed by said microprocessor during the execution of said current process;

a memory including a process control block (PCB) associated with said current process including a first block of bytes containing the context of said process at said point of beginning of said process and a second block of bytes containing the context of said process at said point of interruption of said process; and control means for controllably restoring said current process, when interrupted, to the point of beginning or to the point of interruption when a process switch operation occurs.

2. The system in accordance with claim 1 wherein said first register array includes a register containing an initializing bit (I) having a binary zero or a binary one value, and said control means includes apparatus responsive to the value of said (I) bit for directing said control means to restore said process to either its point of beginning or to its point of interruption.

3. A system in accordance with claim 1 wherein said memory stores a plurality of processes with an associated process control block for each of said processes.

4. A system for switching between a plurality of processes comprising:
- a microprocessor for selecting one of said plurality of processes as a current process and executing said current process, including a register array for storing data used in the execution of said current process and containing a first initializing I bit;
- a user memory including therein a processor control block (PCB) associated with each process of said plurality of processes and comprising first and second blocks of address space for instructions and data associated with the beginning of said each process and the point of interruption of said each process respectively and each of said blocks of address space including a second initializing I bit; and
- control means responsive to said first and second I bits and to a process switch instruction, for storing the contents of said register array in said first or second block of address space of the associated PCB of a newly selected process in said register array.

* * * * *